Sept. 15, 1942.   D. E. BATESOLE   2,295,771
PROTECTIVE COVERING FOR BEARINGS
Filed March 11, 1940

INVENTOR.
DWIGHT E. BATESOLE
BY C. P. Goepel
ATTORNEY.

Patented Sept. 15, 1942

2,295,771

UNITED STATES PATENT OFFICE 2,295,771

PROTECTIVE COVERING FOR BEARINGS

Dwight E. Batesole, Glenbrook, Conn., assignor to Norma-Hoffman Bearings Corporation, Stamford, Conn., a corporation of New York Application March 11, 1940, Serial No. 323,335

4 Claims. (Cl. 206—46)

This invention relates to ball and roller bearings or the like.

The object of the invention is to provide a protective covering for such bearings to be applied, preferably at the factory prior to shipment, and to be removed just before the bearing is to be used.

In many installations, there is a considerable amount of unavoidable dust in the air, and this dust necessarily drops or collects in the bearings during their assembly into the apparatus in which they are to be used. Also dirt from the housings and other mounting parts enters the bearings. Then when the bearings and other parts have been finally assembled and the parts operated, the dust is ground into the rolling elements and frequently destroys the same.

Completely sealed ball bearings have been used in the past to provide the necessary protection against the entrance of this dust and dirt but such sealed bearings are operated with the seals permanently in position. Bearings so made are usually lubricated with the grease originally applied to them when manufactured and they do not allow the desirable free access to the bearing and the circulation through the bearing, of any supplementary lubricant, either oil or grease, which may be present in the housings surrounding the bearings, whereas the use of a temporary and detachable covering permits this to be carried out.

The invention will be more fully described hereinafter, embodiments thereof shown in the drawing, and the invention will be finally pointed out in the claims.

In the accompanying drawing.

Similar characters of reference indicate corresponding parts throughout the various views.

Figure 1:
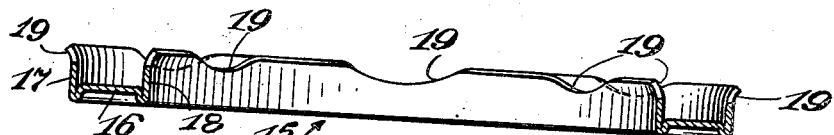
Figure 1 is a plan view partly in section of the improved protective covering.
Figure 2:
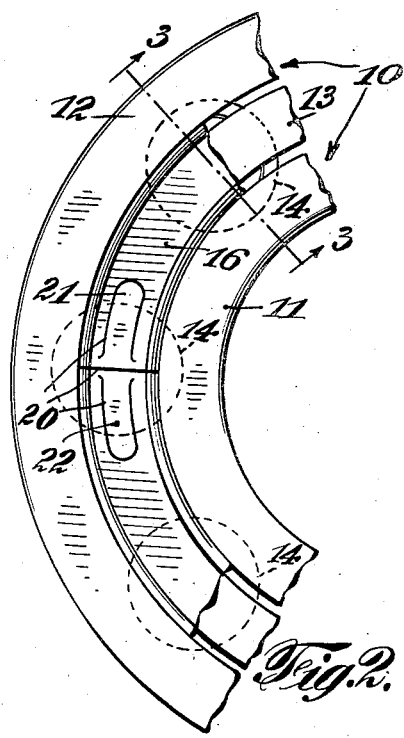
Figure 2 is a partial side view of a bearing, showing the protector applied thereto.

Referring to the drawing and more particularly to Figure 1, and Figure 2, the usual ball bearing 10 has an inner race ring 11, an outer race ring 12, a retainer 13 and balls 14. This is known.

The improvement consists in the cup shaped annulus 15 as shown in Figure 1, which has a web 16 and flanges 17 and 18. The flanges have cut outs 19 circumferentially disposed to allow clearance for the balls. The web 16 has a scored cut at 20 and scored handles or lifting tongues 21 and 22, one at each end of the annulus. Thus, when the handles are disposed outwardly, they can be readily gripped between the fingers and the covering can be readily removed from the bearing and from around the shaft.

Figures 3, 4:
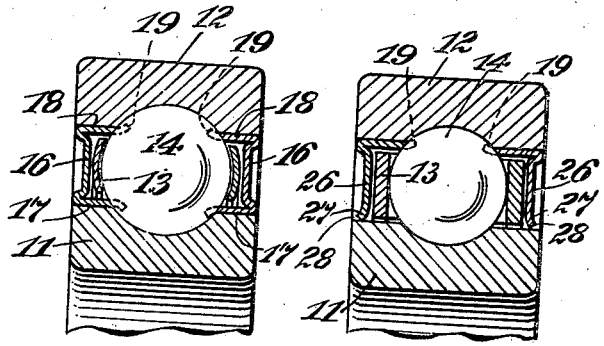
Figure 3 is a transverse section taken on the line 3—3 of Figure 2.
Figure 4 is a similar section of an alternative form.

When the annulus shown in Fig. 1 is snapped into position on a ball bearing, it takes the position shown in Figure 3.

Figures 5, 6:
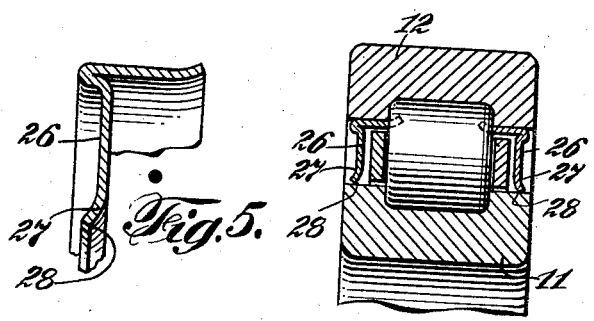
Figure 5 is a section of the protector itself, separate from the bearing, the protector being of the form as shown in Figure 4.
Figure 6 is a view similar to Figure 4, but the protector is applied to a roller bearing.

Instead of having two flanges, an annulus of only one flange can be used, as shown in Figure 5, which, when applied to a ball bearing, appears as in Figure 4 and when applied to a roller bearing 25, appears as in Figure 6.

It is noted that in Figures 4 and 6, the flange 26 is bent outwardly at 27, and the free end 28 contacts with the inner race so as to make a dust tight closure. This can also act as a lubricant closure when the bearings are packed with grease and are for use in housings with a supplementary grease supply in them.

Figure 7:
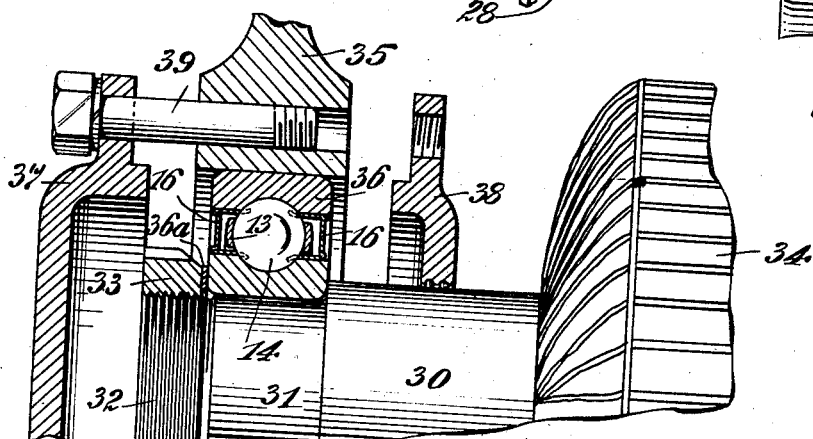
Figure 7 is a longitudinal section of the various parts of an installation ready to be assembled just after the ball bearings have been inserted in place and just before the protective covering is to be removed from the bearing.

In Figure 7 is shown an asemblage of known parts such as assembled in a motor or similar unit in and around a mine, steel mill, cement plant or the like, where air is peculiarly heavy laden with dust particles and where it is extremely difficult to keep mounting parts and bearings clean during handling. The shaft 30 has a subcaliber portion 31, and a screw threaded end 32, over which a screw threaded nut 33 fits. Upon the shaft 30 an armature 34 is secured. The housing 35 into which the shaft and bearings 36 are fitted is provided with two movable cap plates 37 and 38, bolts 39 to hold the cap plates 37 and 38 in position, with the ball bearings 36 therebetween. A lock washer 36a is disposed between the inner race ring of the bearings and the threaded nut. While all these various parts are being assembled, which takes time since adjustments are necessary, the ball bearing or roller bearing as heretofore used is exposed and dust settles upon the raceways and balls. To prevent this, the bearing is provided with the paper protective covering described, while the parts are being assembled, and at the end the covering is removed, and as it has no value, it is discarded. After removal of the covering, free circulation of the oil or grease in the bearing housing and through the bearing is permitted. In Figure 7, a covering like that of Figure 1 is shown but the other form as shown in Figure 5 could have been utilized just as well.

A protective covering as described is placed at both sides of the balls or rollers. The covering is a cleanliness shield which is removed after the bearing has been mounted.

One of the problems in many of the plants is the storage of spare motor armatures since the user likes to have the bearings already installed therein, so that in case of a motor failure the new armature can be shipped into position immediately. The bearings with the protective covering may thus remain exposed on such armature shafts and the covering will effectively keep out all dust and dirt during storage.

The invention has been described but it will be clear that changes will be made within the principle of the invention described without departing from the scope of the subjoining claims.

I claim:

1. A protective covering for bearings having inner and outer race rings spaced by antifriction members therebetween, comprising an annulus web portion of a width substantially equal to the space between the race rings, a flange thereon having recesses for the antifriction members of the bearing, said flange being substantially at right angles to the web portion, said flange being adapted to press against the race rings to hold the covering in position, and means for gripping the annulus web for removing the covering from the bearing.

2. A protective covering for bearings having inner and outer race rings spaced by antifriction members therebetween, comprising an annulus web portion of a width substantially equal to the space between the race rings, a flange at each edge of the web, each flange having recesses for the antifriction members of the bearing said flange being substantially at right angles to the web portion, said flanges being adapted to press against the race rings to hold the covering in position, and means for gripping the annulus web for removing the covering from the bearing.

3. A one time use destructible protective covering made of fibre, paper, cardboard or the like, consisting of an annulus web and a circumferential flange, adapted to be spaced between the outer and inner race rings of a bearing, the flange being adapted to press on a race ring of an antifriction bearing, the flange being substantially at right angles to the web portion for preventing foreign materials entering the bearing parts, and being readily removable from the bearing just prior to actual use of the bearing, said web and flanges being adapted to fill in the space between the race rings of said bearing, the web having a radial width substantially equal to radial distance between the race rings, the flange contacting with one race ring and the web with the other.

4. A one time use destructible protective covering made of fibre, paper, cardboard or the like, for anti-friction bearings having an inner and outer race ring, consisting of an annulus web and a circumferential flange joined thereto, said web adapted to be spaced between the outer and inner race rings of a bearing and of a width substantially equal to the radial distance between the race rings, said flange being adapted to exert pressure on one of the race rings due to its own inherent resiliency, said flange being substantially at right angles to the web, said cover ring preventing foreign materials entering the bearing parts, and being readily removable from the bearing just prior to the actual use of the bearing.

DWIGHT E. BATESOLE.